Oct. 19, 1948.　　　　P. Y. K. HOWAT　　　　2,451,951
APPARATUS FOR MOLDING CONCRETE WALLS
Filed June 6, 1946　　　　　　　　　　　　2 Sheets-Sheet 1
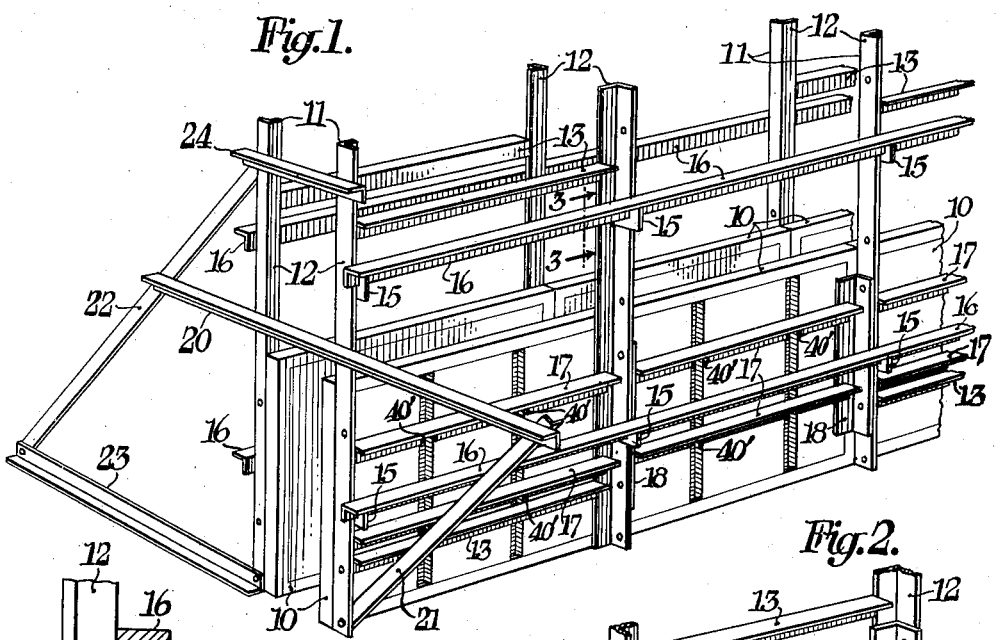
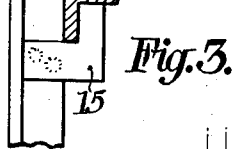
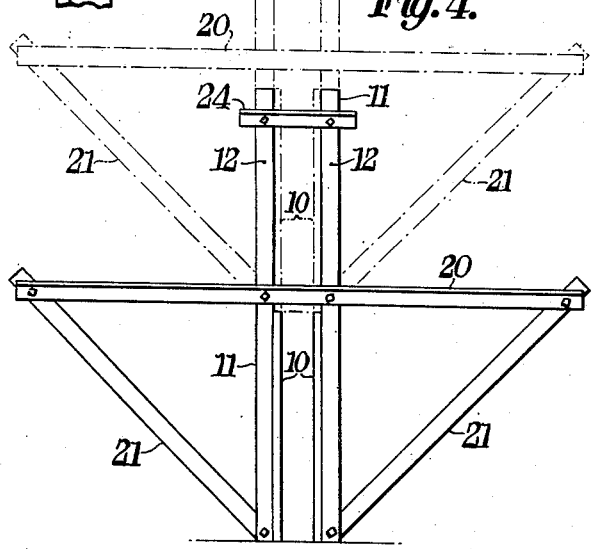
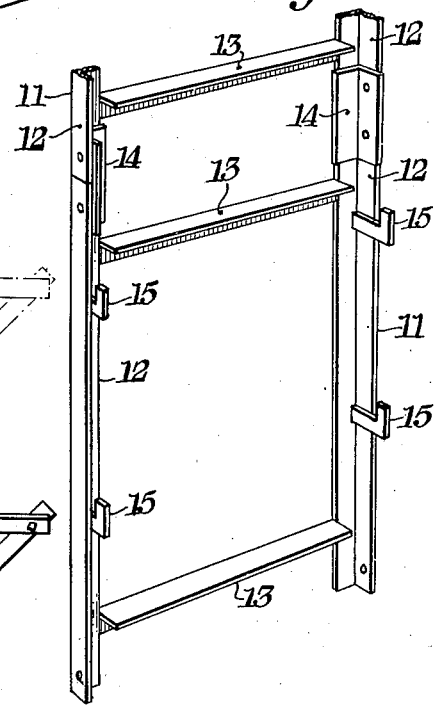
Inventor,
Philip Y. K. Howat,
By
Attorney.

Oct. 19, 1948. P. Y. K. HOWAT 2,451,951
APPARATUS FOR MOLDING CONCRETE WALLS
Filed June 6, 1946 2 Sheets-Sheet 2
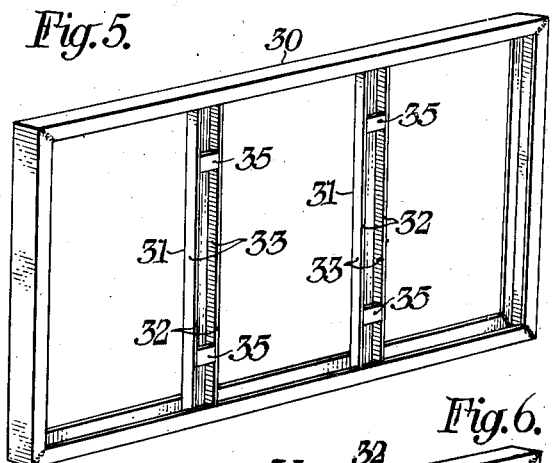
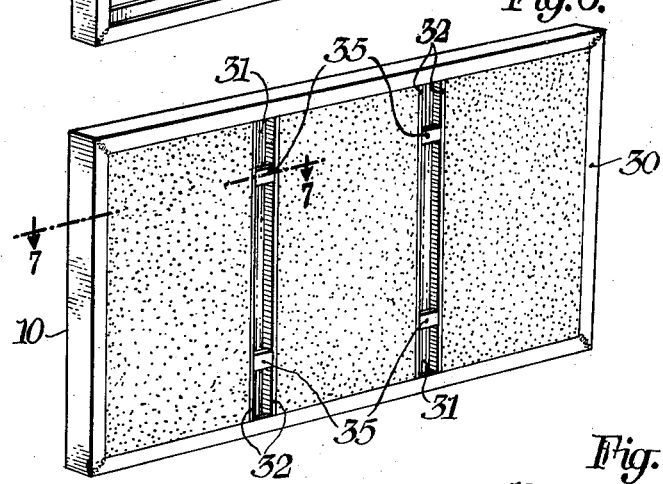
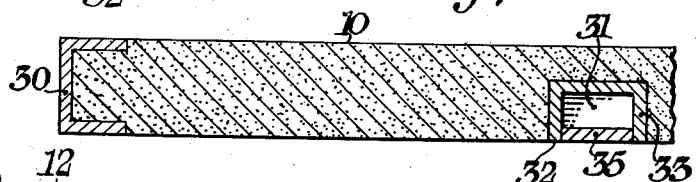
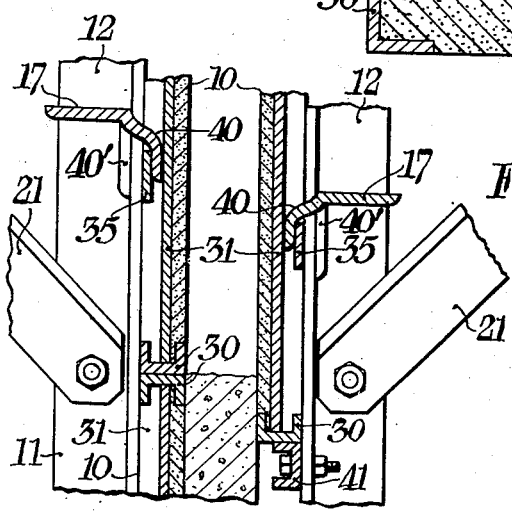
Philip Y. K. Howat,
INVENTOR;
BY
ATTORNEY.

Patented Oct. 19, 1948

2,451,951

UNITED STATES PATENT OFFICE 2,451,951

APPARATUS FOR MOLDING CONCRETE WALLS

Philip Y. K. Howat, Washington, D. C.

Application June 6, 1946, Serial No. 674,683

4 Claims. (Cl. 25—131)

This invention relates to an apparatus for molding walls or other forms of moldable materials such as concrete, and more particularly to a novel form of mold plaque and to a self-bracing, demountable supporting structure therefor.

There are many known methods and types of apparatus for molding walls and the like of moldable materials such as concrete, of which the most common method is to build a form of wood boards and pour plastic material therein. In order to properly space the walls of the form, they are usually braced by connecting metal strips, called ties, which become embedded in the concrete after it is poured. When the form is removed, the ends of these ties protrude beyond the surface of the molded structure and these free ends are usually broken or cut off adjacent to the surfaces of the molded structure.

Wooden forms are highly unsatisfactory due to the fact that they produce a rough surface on the molded structure, both because of the grain in the wood and because of spaces between adjacent boards. Although highly finished boards may be used, the moisture from the plastic material causes their surfaces to deform and their edges to warp, and they deteriorate so rapidly, that they may be used only two or three times. Furthermore, the use of ties is undesirable because they form blemishes in the molded surfaces, and their ends, if left exposed, become rusted very rapidly.

In view of this situation many different types of apparatus have been proposed which generally employ a metal framework that is arranged to support spaced mold form plaques formed by metal sheets. The metal form plaques have not been completely satisfactory, however, on account of their initial expense and also because they must be replaced rather frequently, at a relatively great expense, because their surfaces become rusted and then have a tendency to adhere to the molded plastic materials. Furthermore, the use of metal ties has been continued, particularly for bracing the bottoms of the forms, so that the molded surfaces that are produced by these supposedly improved arrangements are still left with blemishes.

Having in mind the defects of the prior methods and apparatus, it is an objective of this invention to provide a means for molding concrete or other plastic materials including mold plaques comprising an inexpensive material but having substantial durability and which may be quickly and easily replaced at a relatively small expense. Furthermore, the inventive concept includes a framework for supporting the mold plaques which may be so braced upon itself, from the top thereof, that no ties are necessary, and therefore the molded surfaces will be perfectly smooth and devoid of blemishes.

The foregoing objects and others ancillary thereto, are preferably accomplished, according to a preferred embodiment of the invention, by the provision of mold plaques which are composed of sheets of concrete. Although it is not necessary to do so, it is preferred to cast the sheets of concrete within metal frames as they provide sharp, unbreakable edges which will fit tightly against the edges of adjoining plaques. These plaques may be supported in any desired manner, as by a metal framework, and may be retained in position by any other suitable means. In order to permit ease of assembly and disassembly, however, it is preferred to cast channel irons within the rear surfaces of the plaques and small plates or straps may be secured across portions of the exposed channel sides.

The channel irons perform the function of bracing the plaques while the small plates spanning the channel irons provide means for cooperating with retaining hooks. In the preferred arrangement, suitable cross bars, provided with hooks are placed against the outer sides of the framework with their hooks located within the channels in the rear surfaces of the plaques so that by sliding the bars downward, the hooks will be caught behind the straps or plates spanning the channels. Of course, any other suitable means, such as wire, may be employed for bracing the plaques and any desired arrangement, such as embedded bolts, may be used for retaining them in position. The surfaces of the cement plaques are coated with a suitable material which will prevent the adherence of the plastic molding cement thereto. A variety of materials may be used for this purpose, including shellac, varnish, soap or the like.

Although the concrete mold plaques may be advantageously employed with any type of framework, the best results are obtained by their use in conjunction with a demountable and adjustable mold supporting framework which is braced upon itself so as to avoid the use of ties. The framework may be composed of any suitable structural members, such as angle irons, that may be readily assembled or disassembled by any suitable connecting means, such as bolts. For molding walls or the like, this framework may be composed of the usual two sets of frames to be positioned in spaced relationship to form the opposite sides of the molded wall, and these frames may be properly braced by a horizontal bar attached to the portion of the vertical members of the frame above the mold area, and by angularly positioned bars attached to the horizontal bars and to the bases of the frames, or to the portions of the frame adjacent the bottom portions of the mold area. In order to insure maximum bracing action, the angular bracing bars should be positioned at an angle of 45° or more, relative to the plane of the frames which they brace.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout, and in which:

Fig. 1 is a view in perspective of a self-bracing framework supporting mold plaques formed of sheets of concrete;

Fig. 2 is a view in perspective of one unit of the framework;

Fig. 3 is a cross sectional view taken on lines 3—3 of Fig. 1;

Fig. 4 is an end view in elevation of the framework with a modified bracing arrangement;

Fig. 5 is a view in perspective of a frame for one of the mold plaques;

Fig. 6 is a view in perspective, from the rear, of one of the mold plaques;

Fig. 7 is a cross sectional view taken on line 7—7 of Fig. 6; and

Fig. 8 is a cross sectional view taken through the assembled framework showing two arrangements for supporting upper courses of mold plaques.

A method and apparatus for molding walls and the like, to overcome the defects hereinbefore enumerated, should have the totally distinct characteristics of providing mold plaques that are efficient in operation, durable in quality, and inexpensive in production, and of providing means for bracing a plaque supporting framework without the use of ties that extend through the mold area. Accordingly, a preferred embodiment of the invention comprises a framework composed of a plurality of rectangular frames which are connected or anchored by transverse horizontal bars and braced therefrom by angular bars, and which cooperate in supporting mold plaques on their inner sides. Specifically, with reference to Figs. 1 and 2 of the drawing, mold plaques 10 may be supported in molding position by a plurality of suitably positioned rectangular frames 11. The term "mold plaques" is intended to mean any member which presents a mold surface that forms one confining side of a mold area.

The frames 11 are more clearly shown in Fig. 2 wherein it may be seen that they are composed of two upright angle irons 12 joined by two angle cross bars 13 which are spaced slightly from the ends of the uprights 12. The uprights 12 are positioned so that their angles face toward each other and to the rear with their front flanges lying in the same plane and extending toward each other and their lateral flanges extending rearwardly along the outer side edges of the frame 11. Although the cross bars 13 may be positioned in any desired manner, it is preferred that their vertical flanges be placed in the same plane as the front flanges of the uprights 12 so that they will cooperate in providing a plane against which the mold plaques 10 may be secured. The cross bars 13 are spaced from the ends of the uprights 12 so as to accommodate angle brackets 14 for securing abutting ends of the uprights 12 of superimposed frames 11 when it is necessary to increase the height of the framework.

Each of the uprights 12 has two L-shaped plates 15 secured to their lateral flanges so that, as best shown in Fig. 3, the inner vertical edges of the plates 15 and the rear edges of the lateral flanges of the uprights 12 cooperate to form slots for the reception of one flange of long anchor bars 16 which, as shown in Fig. 1, extend longitudinally of the framework to position a plurality of the frames 11 within the same general plane. The frames 11 are of a width to correspond with the length of the mold plaques 10, however, they are not necessarily aligned side by side but, as shown in Fig. 1, are preferably spaced apart a distance equal to the length of the mold plaques 10 so as to substantially reduce the number of the frames 11 required for any given molding operation. By this arrangement, a plaque 10 may be positioned against the front surface of each of the frames 11 and held in position by lock bars 17 cooperating with the front flanges of the uprights 12. The plaques 10 are positioned between the spaced frames 11 by means of angle brackets 18 which may be secured to the outer sides of the lateral flanges of the uprights 12. Lock bars 17 may cooperate with the front flanges of the brackets 18 for holding the plaques thereagainst in the same manner as with the frames 11.

In order to build a wall, two sets or pairs of the complementary frames 11 are erected facing each other so that mold plaques 10 may be secured to their inner or facing sides to form the mold surfaces for the opposite sides of the wall, as shown in Fig. 1. To brace the two spaced sets of frames, they may be spaced and connected by an elongated horizontally positioned transverse bar 20 that is secured to the lateral flanges of opposed uprights 12 at points above the mold area formed by the plaques 10 or comparable plates or boards. On one side of the framework an angular bar 21 is secured to the bottom of the adjacent upright 12 and the end of the horizontal bar 20. On the other side of the framework, an angular bar 22 has one of its ends secured to the top of the adjacent upright 12, to the other end of the bar 20, and to a more or less horizontal bar 23 connected with the bottom of that upright 12.

The horizontal bars 20 and 23 and the angular bars 21 and 22 firmly brace the opposed uprights 12 relative to each other and without extending through the mold area between the uprights. The angular bar 22 and the bottom horizontal bar 23 also act to prop the framework in an upright position. To obtain maximum bracing effect the angular bars 21 and 22 should be positioned at angles of 45° or more, relative to their respective uprights 12 and preferably will be parallel with each other. If desired, a short transverse bar 24 may be secured to the upper ends of the opposed uprights 12 to space and further brace the structure. For clarity of illustration, only a single bracing arrangement is shown in Fig. 1, however, in the preferred practice such an arrangement will be employed for each pair of opposed uprights 12 so that the entire framework will be firmly braced but without the use of a single embedded tie as heretofore employed.

A modified arrangement is shown in Fig. 4 as comprising the horizontal transverse bar 20 and two of the angularly positioned bars 21 each secured to the opposite ends of the transverse bar 20 and to the bottoms of their adjacent uprights 12. As indicated in Fig. 8, the ends of the angular bars 21 may be beveled or otherwise formed to permit close fitting with the uprights. The short transverse bar 24 may also be employed for bracing the tops of the spaced uprights 12. This arrangement is somewhat simpler than the preferred arrangement and is quite satisfactory for smaller or lighter installations but does not have the structural rigidity that is inherent in the preferred bracing structure. It will be noted that both of these bracing arrangements employ a common principle, that of spacing and bracing the frames by a transverse or cross brace at a point above the mold area and angularly bracing, from the cross brace, the frames adjacent the bottom of the mold area.

It should be understood that the bracing arrangements shown in the drawings are illustrative of their assembly for only the first molding step. That is, in molding a wall of any height, the concrete is poured, molded and usually set in layers or courses rather than molding the whole wall in one pouring. Accordingly, the bracing structures are shown in their positions for bracing the framework which is assembled for molding only the first course which extends the height of the mold plaques 10. To increase the height of the wall, a second course of mold plaques 10 are superimposed on the first course of mold plaques and the bracing structure is elevated on the uprights 12.

This latter arrangement is indicated by broken lines in Fig. 4 wherein it will be seen that additional plaques 10 are indicated as being mounted upon the original plaques 10, the spacing bar 20 as being moved to a point above the second course of plaques 10 and the angular bars 21 secured to the uprights 12 at a point adjacent the bottoms of the upper plaques 10, or in other words, adjacent the bottom of what is then the mold area, in view of the fact that at such time the area between the first plaques 10 is filled with concrete. It will be seen that the bar 20 in its upper position is located above the top of the first frames 11 so that they may be connected either to upper frames 11, which have been attached as shown in Fig. 2, or they may be connected to short extensions such as the brackets 14. Although the elevated position of the bracing arrangement is shown only in connection with the simplified arrangement, it will be understood that the preferred bracing arrangement shown in Fig. 1 will be elevated in like manner.

It may be noted in Fig. 4 that the frames 11 are substantially the height of two of the mold plaques 10. It has been found that the greatest versatility of use in molding all types of structures is obtained by fabricating the frames 11 from 2" angle irons with the uprights 12 being 5' in height and their outside edges being 4' apart, with the lower cross bars 13 being spaced 9" from the bottoms of the uprights 12 and the upper cross bars 13 being spaced 1' from the tops of the uprights 12. The positioning of the cross bars 13 is such as to accommodate the connecting angle brackets 14. The mold plaques 10 are 2½' high and 4' wide so that when two of the plaques are superimposed with their longitudinal edges abutting, they completely cover the area of one of the frames 11. The plaques 10 may be of any thickness but in the preferred structure they are ¾" thick. The various elements of the framework may be connected together in any desired manner but the most satisfactory has proved to be the use of ordinary commercially available bolts and nuts so that bolt holes may be bored both in predetermined locations and in different locations as needed.

Any type of mold plaques, plates or boards may be used with the framework hereinbefore described, the preferred plaques 10, however, as previously stated, comprise cast sheets of concrete. The term plaque, as used in connection with the prior description relating to the framework, is intended to include broadly all mold forming elements such as plates, boards or the like. The concrete sheets forming the plaques 10 are preferably cast within metal frames that serve both to provide sharp edges and corners and to form a protective covering around the edges of the concrete. Accordingly, as shown in Fig. 5, a rectangular frame 30 is formed of channel irons with the channels thereof facing inwardly. These frames 30 are preferably braced by upright channel irons 31 which are positioned so that the edges 32 of their flanges 33 are flush with the outer surfaces of one of the flanges 34 on one side of the frame 30. The bracing channel irons 31 have small plates or straps 35 secured across their open channels with the outer surfaces of the members 35 lying flush with the edges 32 of said braces 31.

This frame structure may be fabricated in any desired manner, as by welding, and then placed on a suitable surface or in a suitable mold so that concrete may be poured therein to completely fill the frame 30 with the surfaces of the molded sheet lying flush and smooth with the outer surfaces of the frame flanges but with the exception that the channels of the braces 31 are left open and free of cement. The completed plaque 10 is shown in Fig. 6 from the side containing the open channels 31, which is the rear side of the plaque, and the cement surface is shown as lying flush with the outer surfaces of the frames 30 and the edges 32 of the channel members 31. This cement surface should be level so that the plaque will fit snugly against its supporting framework. The opposite surface of the plaque forms the mold surface and it should not only be level but should be troweled smooth so that there are no blemishes whatsoever in the surface. Of course, if desired, the mold surface may be formed to create a surface simulating stone, brick or the like. The straps 35 across the channels 31 are provided for use in the preferred method of mounting the plaques 10 to the framework.

As hereinbefore described in connection with Fig. 1, the plaques 10 are positioned by lock bars 17. As best shown in Fig. 8, the lock bars 17 have hook-like tongue elements 40 struck as at 40' from their vertical flanges which are adapted to fit within the channels 31 and behind the straps 35. This structure provides a very simple arrangement for quickly and easily mounting and dismounting the plaques 10. The plaques need only to be placed against the framework so that the lock bars 17 may be positioned against the opposite sides of the flanges of frames 11 and with the tongues 40 within the channels 31 and then the bars 17 may be slid downwardly until their tongues 40 are seated behind the straps 35 thus releasably clamping or binding the plaques in position on their frames 11.

A wall is usually molded in courses, as hereinbefore stated in connection with Fig. 4, and one plaque 10 may be mounted edge to edge on top of another plaque 10 for conveniently forming the courses. This arrangement is shown in detail on the left-hand side of the mold structure shown in Fig. 8. For various reasons it is sometimes desirable to remove the lower plaques 10 after the molded wall has become set but before an upper course has been molded thereon. In such a case the mold plaques for the upper course are preferably supported by a longitudinal channel bar bracket 41 secured to the inner sides of the frames 11. In order to prevent the possibility of deforming the molded surface, the supporting bars 41 are not positioned flush with the top of the molded wall but are located slightly, preferably about 2", below the top of the wall.

As hereinbefore noted, the plaques 10 have the advantages of the metal mold plates in that they have sharply defined nondeformable edges and corners that fit snugly with adjoining plaques so that the surface of the molded wall is free from ridges or the like as when formed by loose fitting mold boards. Furthermore, they have the very distinct advantage over the metal plates in their low cost and their non-susceptibilty to deterioration. In order to prevent the adherence of the plastic molding material thereto, the surfaces of the plaques 10 are coated with a suitable non-bonding material such as shellac, varnish, soap or the like. Of course, these coatings protect the metal surfaces of the frames 30 against deterioration as well as performing their primary function. Accordingly, the plaques 10 may be used time and again as long as they are properly coated with the non-bonding material. In the event that, through mishandling, their concrete surface becomes cracked or chipped, it may be very easily replaced, and at slight expense, by knocking out the old concrete and casting a new sheet within the same frame 30.

Although certain specific embodiments of the invention have been shown and described, it is quite obvious that many modifications thereof are possible. The invention, therefore, is not to be restricted except insofar as is necessitated by the prior art and by the spirit of the appended claims.

That which is claimed, as new, is:

1. A mold board or the like for use with a supporting framework in molding walls of plastic material such as concrete which comprises a frame formed of inturned channel members, bracing channel members extending between two opposed sides of said frame, straps spanning the channels of said bracing members for cooperating with retainers, and a sheet of concrete completely filling said frame except for the channels in said bracing members.

2. A mold board or the like for use with a supporting framework in molding walls of plastic material such as concrete which comprises a frame formed of inturned channel members, bracing channel members extending between two opposed sides of said frame and positioned so that its free edges lie flush with the outer surfaces of said frame, straps spanning the channels of said bracing members for cooperating with retainers, and a sheet of concrete completely filling said frame flush with the outer surfaces thereof except for the channels in said bracing members.

3. An apparatus for molding walls and the like from a plactic material such as concrete which comprises spaced rectangular frames, mold plaques supported by said frames on their facing sides to define a mold area therebetween, said plaques having depressions in their rear surfaces with flanges overlying a portion of said depressions, and retainers spanning said frames and on the opposite sides thereof from said plaques, said retainers having laterally extending tongues to fit within said depressions and behind said flanges.

4. An apparatus for molding walls and the like from a plastic material such as concrete which comprises spaced rectangular frames, mold plaques supported by said frames on their facing sides to define a mold area therebetween, said plaques including a frame formed of inturned channel members, bracing channel members extending between two opposed sides of said frame and positioned so that its free edges lie flush with the outer surfaces of said frame, straps spanning the channels of said bracing members, and a sheet of concrete completely filling said frame flush with the outer surfaces thereof except for the channels in said bracing members, and retainers spanning said supporting frames and on the opposite sides thereof from said plaques, said retainers having laterally extending tongues to fit within the channels in said plaques and behind the straps spanning said channels.

PHILIP Y. K. HOWAT.

REFERENCES CITED

The following references are of record in the file of this patent:

UNITED STATES PATENTS

| Number | Name | Date |
|---|---|---|
| 854,098 | Mann | May 21, 1907 |
| 946,233 | Larzelere | Jan. 11, 1910 |
| 1,020,164 | Symons | Mar. 12, 1912 |
| 1,270,793 | Davidson | July 2, 1918 |
| 1,489,074 | Flagg | Apr. 1, 1924 |
| 1,560,494 | Trester | Nov. 3, 1925 |
| 1,674,042 | Hickey | June 19, 1928 |
| 1,945,124 | Strauss | Jan. 30, 1934 |
| 2,005,301 | Rafter | June 18, 1935 |
| 2,115,936 | Sterns | May 3, 1938 |
| 2,306,107 | Henderson | Dec. 22, 1942 |
| 2,313,880 | Leggett, Sr. | Mar. 16, 1943 |